United States Patent [19]
Wally, Jr.

[11] Patent Number: 4,475,146
[45] Date of Patent: Oct. 2, 1984

[54] FRONT LIGHTING SYSTEM FOR PHOTOGRAPHY

[75] Inventor: Joseph H. Wally, Jr., Shawnee Mission, Kans.

[73] Assignee: Opti-Copy, Inc., Lenexa, Kans.

[21] Appl. No.: 514,633

[22] Filed: Jul. 18, 1983

[51] Int. Cl.³ .............................................. G03B 15/02
[52] U.S. Cl. ........................................ 362/11; 362/16; 362/17; 362/18; 362/145; 362/147; 362/234; 362/241; 362/249; 362/250; 362/282; 362/283; 362/297
[58] Field of Search ........................ 362/11, 16, 18, 17, 362/145, 147, 234, 241, 249, 250, 282, 283, 297

[56] References Cited

U.S. PATENT DOCUMENTS

| | | | |
|---|---|---|---|
| 3,165,025 | 1/1965 | Hart | 362/11 |
| 3,185,828 | 5/1965 | Ludloff | 362/11 |
| 3,952,322 | 4/1976 | Wolfe | 362/11 |
| 3,970,835 | 7/1976 | Crete | 362/11 |

Primary Examiner—Stephen J. Lechert, Jr.
Attorney, Agent, or Firm—Kokjer, Kircher, Bradley, Wharton, Bowman & Johnson

[57] ABSTRACT

A special front lighting system for use in a relatively narrow room in which a large track mounted camera photographs subjects held on a subject holder. A pair of light sets located on support panels on opposite sides of the optical axis of the camera emit diverging light beams in opposite directions toward the side walls of the room. Mirrors are situated in the paths of the light beams to reflect light onto the subject holder with the same effect as imaginary light sets emitting beams directly toward the subject holder from locations outside of the room beyond the side walls. Light containment shields extend between each light support panel and mirror. The components of the lighting system are contained on self-supporting stands, each of which includes one light support panel, one light shield and one mirror panel hinged or otherwise held in a fixed position together.

20 Claims, 4 Drawing Figures

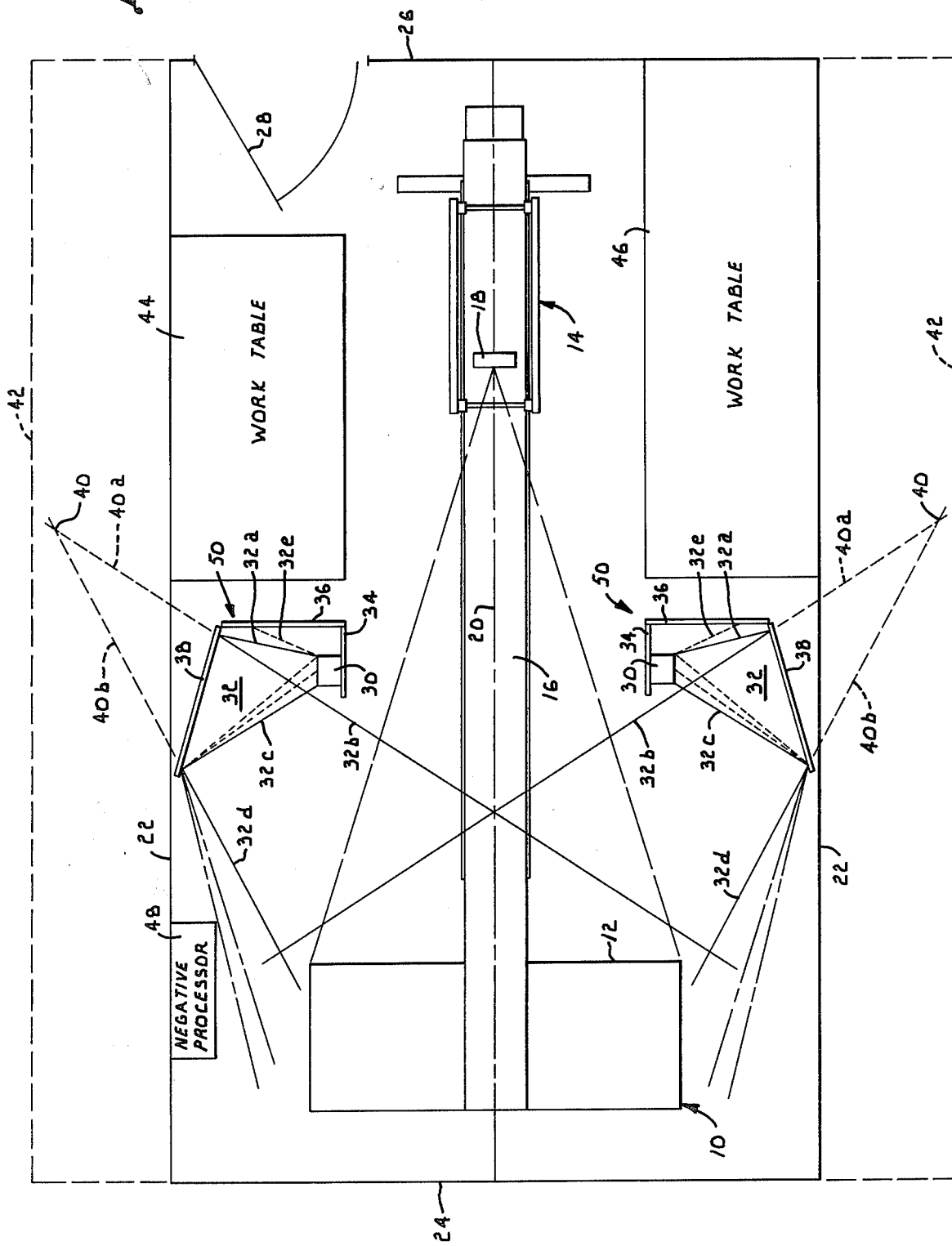

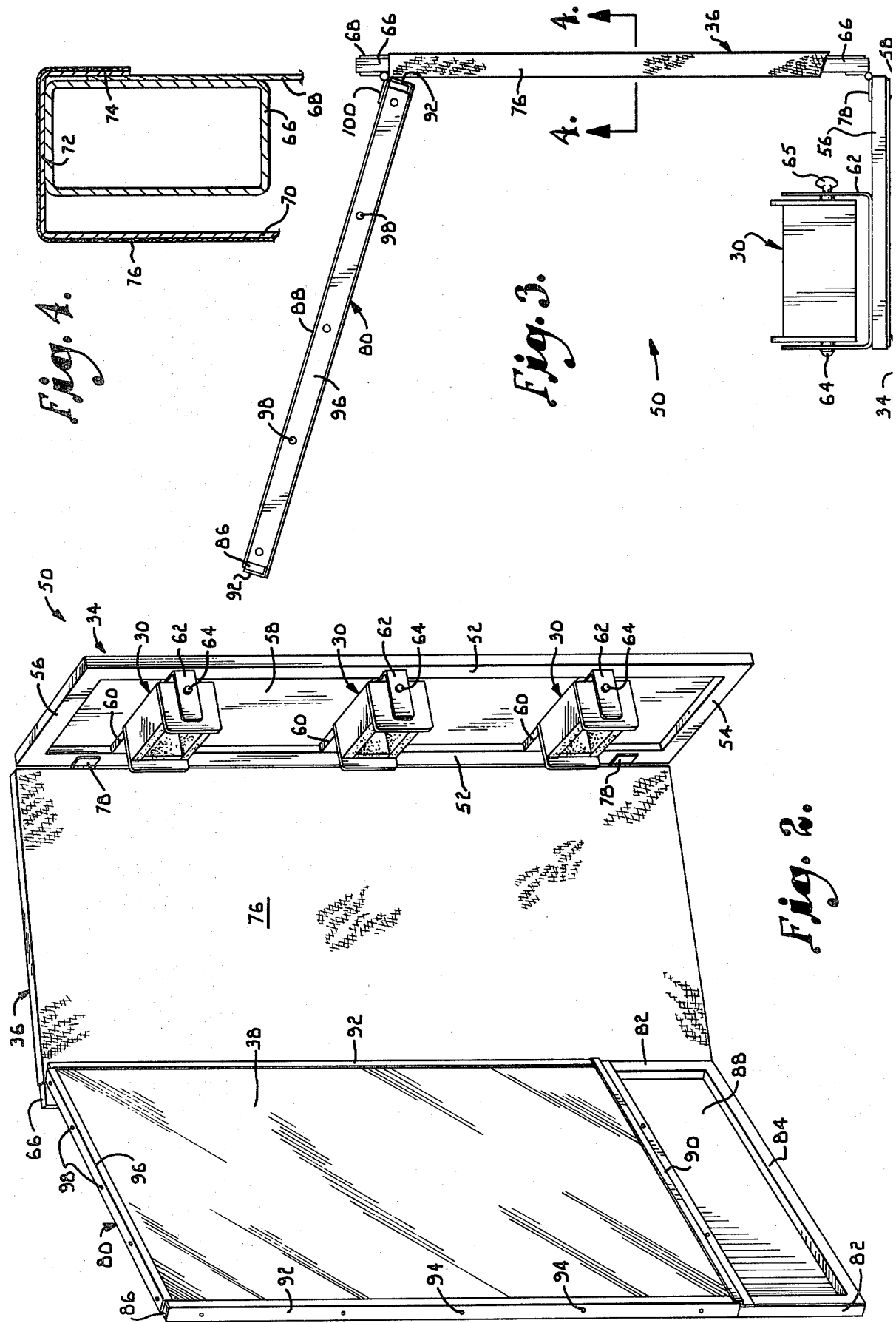

FRONT LIGHTING SYSTEM FOR PHOTOGRAPHY

BACKGROUND AND SUMMARY OF THE INVENTION

This invention relates in general to lighting systems for photography and more particularly to a special front lighting system for use in situations involving limited space availability.

In high quality commercial and industrial photography, good lighting is essential to accurate photographer reproduction. The camera system that is often used includes a large camera mounted on an overhead track to provide camera movement toward and away from a subject holder located at one end of the track. The subject is held on the front face of the subject holder and is usually lighted both from the front and from behind. The front lighting is normally provided by a pair of lights located in front of the subject holder and on opposite sides of the room.

Although this type of front lighting system is entirely satisfactory for the most part, it requires a wide room because the two front lights are located well to the sides of the subject holder and are oriented to cover its entire front face. When photography operations must be carried out in a relatively small or narrow room, the conventional front lighting system is not suitable because of its space requirements. At present, there are no known front lighting systems available for use in high quality photography to effectively light wide subject holders in narrow rooms. It is the primary goal of the present invention to provide a front lighting system which is not subject to the space limitations associated with the systems that have been proposed in the past.

More specifically, it is an object of the invention to provide a front lighting system which can be installed in a narrow room and yet functions to light a subject holder as effectively as conventional front lighting systems requiring more space. In accordance with the invention, special panelized stands include mirrors which are strategically placed and oriented to reflect light toward the subject holder with the same effect and intensity as light sources placed farther apart in wider rooms. The mirrors permit the light sources to be situated well within the interior of the room, thereby reducing the space requirements in comparison with conventional front lighting systems.

Another object of the invention is to provide a front lighting system which applies light to the subject holder uniformly across its front face. The lights and mirrors are arranged symmetrically about the optical axis of the camera in a configuration which gives the same amount of effective light to all parts of the subject holder face. Accordingly, there are no bright spots or dim spots on the face of the subject holder.

A further object of the invention is to provide, in a front lighting system of the character described, light containment shields which confine the light to only the face of the subject holder which is the only area that requires light for purposes of the photography operation. At the same time, the shields prevent the remainder of the room from being flooded with light.

An additional object of the invention is to provide a front lighting system of the character described which is suitable for use in rooms of various sizes.

A still further object of the invention is to provide, in a front lighting system of the character described, a stand structure which includes the light fixtures, mirror and shield in a single unit. It is another important feature of the invention that the stand arrangement permits variation in the orientation of the mirrors and shields to increase its versatility and accommodate a wide variety of photographic configurations.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith:

FIG. 1 is a diagrammatic top plan view of a photography room equipped with a front lighting system constructed and arranged in accordance with a preferred embodiment of the present invention;

FIG. 2 is a perspective view of one of the light and mirror stands used in the front lighting system;

FIG. 3 is a top plan view of the stand, with a portion broken away for purposes of illustration; and FIG. 4 is a fragmentary sectional view on an enlarged scale taken generally along line 4—4 of FIG. 3 in the direction of the arrows.

Referring now to the drawing in detail and initially to FIG. 1, numeral 10 generally designates a subject holder which is used to hold subjects that are to be photographed. The subject holder 10 has a front face 12 which holds the originals, usually by means of vacuum and behind a clear cover. The front face is located in a vertical plane. Back lightening is normally provided from behind the subject holder face 12.

The photographic reproduction of the subject is carried out by a large track-mounted camera generally designated by numeral 14. The camera 14 is mounted for movement along an overhead beam 16 providing a track which extends perpendicular to the subject holder face 12. The camera 14 has a lens 18 that moves back and forth along an optical axis 20 of the camera as the camera is moved back and forth along the overhead beam 16. The optical axis 20 is horizontal and is transversely centered on and perpendicular to the face 12 of the subject holder 10.

The room in which the photography operations are carried out is bounded by opposite side walls 22, a back wall 24 located behind the subject holder 10, and a front wall 26 having a door 28. The room is rectangular, and the side walls 22 are parallel to the optical axis 20 and perpendicular to the subject holder face 12. Normally, the optical axis is centered in the room between the side walls 22 in order to take maximum advantage of the width of the room, especially in relatively narrow rooms of the type in which the front lighting system of the present invention is used.

The present invention provides a front lighting system which applies light to the front surface of the subject holder face 12. In accordance with the invention, light is provided by two sets of special light fixtures 30 which are spaced on opposite sides of the optical axis 20 equidistantly from it. The light fixtures 30 in the two sets face in opposite directions and direct diverging light beams 32 away from the optical axis and toward the opposite side walls 22 of the room. The light fixtures are identical and emit beams 32 of equal intensity.

Each light fixture 30 is mounted on a vertical support panel 34 located adjacent to a light containment shield 36 which cooperates with the panel 34 to confine the light to the areas that require lighting, namely the front face of the subject holder 10. The two panels 34 are parallel to axis 20. Each shield 36 is perpendicular to the adjacent shield 34 and parallel to the subject holder face 12 at a location to situate the corresponding light fixture 30 between face 12 and the shield 36.

A pair of flat mirrors 38 having reflective surfaces are placed in the paths of the respective light beams 32. One edge of each mirror 38 is located adjacent to the outside edge of the corresponding light shield 36, and the opposite edge of the mirror is located adjacent to the corresponding side wall 22. Each mirror 38 is oriented at an angle with respect to side wall 22 and the optical axis 20. The angle of each mirror 38 with respect to the adjacent side wall 22 can be varied, as will be explained more fully. The mirrors 38 are located and oriented to intercept the light beams 32 and to reflect the light in a manner and direction to cover the entire front surface of the subject holder face 12. For example, the light rays indicated at 32a impinge on the reflective surfaces of mirrors 38 at the edges most remote from the subject holder. The reflected rays 32b reach the remote end of the subject holder face 12 (or slightly beyond it as shown). The light rays 32c impinge on the edges of the mirrors closest to the subject holder face and are reflected at 32d slightly beyond the closest edge of face 12. The rays between rays 32a and 32c, when reflected off of the mirrors 38, cover the entire front surface of the subject holder 12.

It is noted that reflected rays from both sets of light fixtures 30 reach both edges of the subject holder face. The reflected rays 32b from the light set 30 that appears uppermost in FIG. 1 reach the lower edge of the subject holder face, while rays 32d from the lower light source 30 reach the same edge of the subject holder face. Rays 32b travel a greater distance than rays 32d, and the total amount of light reaching the edge portion of the subject holder is the sum of the light reaching it from the two light sets. The same is true for the upper edge of the subject holder face 12 and for all areas between the opposite edges thereof. Due to the arrangement of the components of the lighting system, the same amount of light reaches all parts of the subject holder face 12. Rays such as the rays 32e which are beyond rays 32a are intercepted by the light shields 36.

The application of light to the subject holder face is equivalent to that which would be provided by diverging beams of light emitted directly toward the subject holder from imaginary light sources stationed at the locations indicated at 40 which are well outside of the room beyond the side walls 22. The locations 40 are well behind the mirrors and are defined at the intersections of the imaginary rays 40a and 40b which are extensions behind the mirrors of the respective reflected rays 32b and 32d. The lighting system of the present invention thus provides the same lighting effect as is provided by a conventional front lighting system installed in a wider room and including two light stands mounted at locations 40. For example, the front lighting system of the present invention can be installed in a room having a width of fourteen feet between the two side walls 22. In comparison, a conventional front lighting system having light sources at the locations 40 would require a room width of twenty feet between the imaginary walls located at 42 since the locations 40 are each three feet beyond the side walls 22.

The panels 34, shields 36 and mirrors 38 are all approximately six feet high which is the same height as the subject holder face 12. The panels 34 and mirrors 38 are arranged symmetrically about the optical axis 20, and the optical axis is centered on the height dimension of the subject holder face 12. Consequently, the two sets of light fixtures 30 and mirrors 38 apply light to the subject holder face with uniform intensity across its entire height. This uniform lighting effect assures high quality photography and avoids the introduction of bright spots or dim spots. At the same time, the mirrors 38 are wide enough to reflect the light across the entire width of the subject holder face.

It is thus apparent that the front lighting system of the present invention can be used in a relatively narrow room to light the subject holder 10 in a manner equivalent to a conventional front lighting system installed in a wider room. A pair of work tables 44 and 46 can be provided adjacent to the opposite side walls 22 and behind the shields 36. A negative processor 48 can be provided adjacent one of the side walls at a location to one side of the subject holder 10.

In accordance with the present invention, panel 34, shield 36 and mirror 38 are connected together to form stand structures 50, one of which is illustrated in detail in FIGS. 2-4.

The support panel 34 of each stand 50 carries one set of three light fixtures 30 which are vertically spaced apart from one another. The panel 34 has a rectangular frame which includes parallel uprights 52 extending along opposite sides of the panel and formed by rectangular tubing. A bottom rectangular tube 54 and a top rectangular tube 56 form the top and bottom frame members. A back panel 58 is riveted or otherwise suitably secured to each of the frame members. Additional rectangular tubes 60 extend horizontally between the uprights 52 to support the light fixtures 30. All components of each support panel 34 are painted black or another dark color.

Each light fixture 30 is supported on a U-shaped bracket 62 secured to the cross member 60 by bolts or any other suitable fasteners. Each fixture 30 is a box-like structure open at the front and provided with a bulb (not shown) within its interior. The interior surfaces of each fixture are light reflective surfaces. Each fixture 30 is mounted to its bracket 62 for pivotal movement about a horizontal pivot axis 64 in order to direct the light movement about a horizontal pivot axis 64 in order to direct the light somewhat upwardly or downwardly. Once the angle of the fixture 30 has been selected, it can be fastened at the selected angle by tightening a fastener 65.

The light containment shield 36 is constructed in a manner similar to the support panel 34 but is considerably wider. The frame of panel 36 is formed in a rectangular configuration by vertical and horizontal square tubes 66 (the top one of which is shown in FIGS. 3 and 4). A back panel 68 is secured by rivets or the like to the frame. A metal front panel 70 (see FIG. 4) has a flange 72 turned rearwardly from its top edge to extend above the top frame member 66. A down turned lip 74 on the back edge of flange 72 extends behind the frame member 66 and the top edge of the back panel 68. Rivets or other suitable fasteners (not shown) are used to secure flange 72 and lip 74 to the frame of the light containment shield 36.

A flat web of dark fabric 76 (which may be black velveteen) is adhesively secured to the outside surfaces of panel 70, flange 72 and lip 74. The fabric 76 covers the entire front surface of the light shield 36 in order to prevent reflectance of any light emitted by the light fixtures which reflectance would show as a reflected image on the mylar curtain over the subject holder.

The light support panel 34 is connected with one side edge of the light containment shield 36 by a plurality of hinges 78. The hinges 78 permit a variation in the angle between panel 34 and the adjacent shield 36, although such angle is normally approximately 90° as shown in FIG. 3. The hinges 78 are on the inside surfaces of the two panels and provide a vertical hinge axis about which the panels can be adjusted.

The mirror 38 is held on a vertical panel 80 having a rectangular frame formed by a pair of vertical uprights 82, a bottom cross member 84 and a top cross member 86, all of which are in the form of a rectangular tube. A back panel 88 is riveted or otherwise secured to the frame members at a location behind the mirror 38.

The lower edge of the mirror 38 is received by a Z-shaped bracket 90 secured to extend horizontally between the uprights 82 a short distance above the lower cross member 84. The side edges of the mirror are held by angles 92 secured to the uprights 82 by rivets 94. The upper edge of mirror 38 is held by an angle 96 secured by rivets 98 to the upper cross member 86 of the mirror panel frame.

The mirror panel 80 is hingedly connected to the light containment shield 36 by a plurality of hinges 100 located on the side edge of shield 36 opposite hinges 78. The hinge axis is vertical and permits the relative angle between panels 36 and 80 to be adjusted. The hinges 100 are connected with the back surface of the mirror panel 80 and with the front surface of the shield panel 36.

As previously indicated, the fabric 76 is preferably a black color in order to avoid reflecting light. For the same reason, the components of panel 80 except for the mirror 38 are painted black. The support panel 34, shield 36 and mirror panel 80 are all generally planar panel members which stand in upright positions during use.

The stand structure 50 shown in FIGS. 2 and 3 is a right hand unit (as viewed from the camera 14). It is to be understood that the other stand 50 is a left hand unit which is constructed in the same manner but as a mirror image of the stand shown in FIGS. 2 and 3.

The stands 50 contain all necessary components of the front lighting system and permit the relative angles between each panel 34, shield 36 and mirror 38 to be adjusted as desired to fit the particular configuration necessary for accurate, high quality photographic reproduction. At the same time, the stands 50 are self-supporting units which are portable and can be easily positioned as desired for use.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, what is claimed is:

1. In a photographic room having a subject holder presenting a front face contained in a substantially vertical plane and a camera with a substantially horizontal optical axis generally centered on and perpendicular to said front face, a front lighting system comprising:

a pair of light sets located on opposite sides of said optical axis and oriented to direct diverging beams of light in opposite directions away from said optical axis;

a light shield for each light set located adjacent thereto for shielding the camera from the light beams from said light sets; and a pair of mirrors for reflecting the beams of light emitted by the respective light sets toward the subject holder, said mirrors being located in the paths of the respective light beams and being oriented to reflect the light impinging thereon toward the subject holder and each mirror having a width to reflect the light across substantially the entire width of said front face of the subject holder.

2. A front lighting system as set forth in claim 1, including a generally upright support panel for each light set supporting the light set thereon and having a generally planar configuration.

3. A front lighting system as set forth in claim 2, wherein each light set includes a plurality of separate light sources vertically spaced from one another on the corresponding support panel.

4. A front lighting system as set forth in claim 3, wherein each light shield comprises a dark shield member adjacent the corresponding support panel and having a generally planar configuration.

5. A front lighting system as set forth in claim 4, including:

a generally planar mirror panel containing each mirror;

first hinge means for hingedly connecting each mirror panel with one edge portion of the corresponding shield member, thereby permitting variation in the angle between the mirror panel and shield member; and second hinge means for hingedly connecting each support panel with an opposite edge portion of the corresponding shield member, thereby permitting variation in the angle between the support panel and shield member.

6. A front lighting system as set forth in claim 1, wherein each mirror is located and oriented to reflect light toward said subject holder front face in a manner equivalent to an imaginary light source emitting a diverging beam of light directly toward the subject holder from a location behind the mirror.

7. A front lighting system as set forth in claim 6, wherein said light sources and mirrors are arranged symmetrically about said optical axis to effect substantially uniform application of light across the width of said front face.

8. In a photographic camera room having opposite side walls and containing a subject holder presenting a front face located in a substantially vertical plane perpendicular to the planes of the side walls and also containing a camera movable toward and away from the subject holder and having a substantially horizontal optical axis extending perpendicular to said front face, a front lighting system comprising:

a pair of light sets located on opposite sides of said optical axis and oriented to emit diverging beams of light in opposite directions toward the opposite side walls of the room;

a pair of mirrors for reflecting the respective light beams toward the subject holder; and means for locating said mirrors adjacent the respective side walls in the paths of the light beams and at orientations to reflect the light impinging thereon toward the subject holder, each mirror being located and oriented to reflect light across substantially the entire width of the front face of the subject holder in a manner equivalent to an imaginary light set emitting a beam of light directly toward the subject holder from a position outside of the room beyond the adjacent side wall.

9. A front lighting system as set forth in claim 8, including a light shield for each light set.

10. A front lighting system as set forth in claim 8, including:

a first light generally upright panel for each light set on which the corresponding light set is mounted; and a second generally upright panel for each light set providing a light shield.

11. A front lighting system as set forth in claim 10, wherein:

said first panels are oriented substantially parallel to said optical axis; and said second panels are oriented substantially perpendicular to said optical axis.

12. A front lighting system as set forth in claim 10, including:

a third generally upright panel for each mirror on which the mirror is mounted;

first hinge means for hingedly connecting said first panel with one edge portion of the corresponding second panel to permit variation in the angle between the first and second panels; and second hinge means for hingedly connecting said third panel with an opposite edge portion of the corresponding second panel to permit variation in the angle between the second and third panels.

13. A front lighting system as set forth in claim 8, wherein each mirror is mounted on a generally planar mirror panel.

14. A front lighting system as set forth in claim 13, wherein said light sets and mirrors are arranged symmetrically about said optical axis to effect substantially uniform application of light across the front face of the subject holder.

15. A front light system for applying light to a subject holder having a front face contained in a substantially vertical plane for holding a subject to be photographed by a camera having a substantially horizontal optical axis extending generally perpendicular to said front face and transversely centered thereon, said lighting system comprising:

a pair of light sets spaced equidistantly from said optical axis on opposite sides thereof, said light sources being oriented to emit diverging light beams of equal intensity in opposite directions away from said optical axis;

a pair of generally upright support panels on which the respective light sets are mounted, each panel being located between the corresponding light set and said optical axis;

a pair of mirrors located to intercept the respective light beams with the rays of light in the light beams impinging across substantially the entire width of the mirrors, said mirrors being spaced equidistantly from the respective light sets and being oriented at acute angles relative to said optical axis to reflect light across substantially the entire width of said front face of the subject holder; and said light sets and mirrors being arranged symmetrically about said optical axis to effect substantially uniform application of light across the width of said front face.

16. A lighting system as set forth in claim 15, wherein each mirror is located and oriented to reflect light toward said front face of the subject holder in a manner equivalent to an imaginary light set emitting a diverging beam of light directly toward the subject holder from a location behind the mirror.

17. A lighting system as set forth in claim 15, including a light shield extending generally between each support panel and the corresponding mirror to shield the light from said light sets.

18. A lighting system as set forth in claim 17, including a dark fabric covering a surface of each shield which is exposed to said light sets.

19. A lighting system as set forth in claim 15, including:

a generally planar mirror panel for each mirror supporting the corresponding mirror thereon and having a substantially upright orientation;

a generally planar light shield for each light set having a substantially upright orientation;

means for hingedly connecting each mirror panel with one edge portion of the corresponding light shield for hinged movement about a substantially vertical hinge axis;

means for hingedly connecting each support panel with an opposite edge portion of the corresponding light shield for hinged movement about a substantially vertical hinge axis; and each support panel cooperating with the corresponding light shield and mirror panel to provide a self-supporting stand in which the angles between the light shield and support and mirror panels can be varied about said hinge axes.

20. A lighting system as set forth in claim 19, wherein each light set includes a plurality of separate light sources spaced vertically apart on the corresponding support panel.

* * * * *